(12) United States Patent
Hall et al.

(10) Patent No.: US 10,309,845 B2
(45) Date of Patent: *Jun. 4, 2019

(54) SOLID-STATE SHEAR STRESS SENSORS WITH HIGH SELECTIVITY

(71) Applicants: SILICON AUDIO, INC., Austin, TX (US); BOARD OF REGENTS OF THE UNIVERSITY OF TEXAS SYSTEM, Austin, TX (US)

(72) Inventors: Neal A. Hall, Austin, TX (US); Donghwan Kim, Austin, TX (US); Randall P. Williams, Austin, TX (US); David P. Gawalt, Austin, TX (US); Bradley D. Avenson, Pflugerville, TX (US); Caesar T. Garcia, Austin, TX (US); Kristofer L. Gleason, Austin, TX (US)

(73) Assignees: Silicon Audio, Inc., Austin, TX (US); Board of Regents of the University of Texas System, Austin, TX (US)

(*) Notice: Subject to any disclaimer, the term of this patent is extended or adjusted under 35 U.S.C. 154(b) by 193 days.

This patent is subject to a terminal disclaimer.

(21) Appl. No.: 15/211,838

(22) Filed: Jul. 15, 2016

(65) Prior Publication Data

US 2017/0016783 A1 Jan. 19, 2017

Related U.S. Application Data

(60) Provisional application No. 62/193,209, filed on Jul. 16, 2015.

(51) Int. Cl.
*G01L 1/16* (2006.01)
*G01L 1/14* (2006.01)

(52) U.S. Cl.
CPC .............. *G01L 1/16* (2013.01); *G01L 1/148* (2013.01)

(58) Field of Classification Search
None
See application file for complete search history.

(56) References Cited

U.S. PATENT DOCUMENTS

| 4,951,510 A | 8/1990 | Holm-Kennedy et al. |
| 5,052,228 A | 10/1991 | Haritonidis |
| 6,809,516 B1 | 10/2004 | Li et al. |
| 7,942,072 B2 | 5/2011 | Chang et al. |

(Continued)

*Primary Examiner* — Clayton E. LaBalle
*Assistant Examiner* — Dennis Hancock
(74) *Attorney, Agent, or Firm* — Meyertons Hood Kivlin Kowert and Goetzel PC; Jeffrey C. Hood; Brian E. Moore (57) ABSTRACT

Embodiments of solid-state stress sensors are presented herein. A sensor system may include a substrate, a first layer of sensing material disposed on a first surface of the substrate, and at least three electrodes forming a first and second electrode pair. The at least three electrodes may include a first electrode, a second electrode, and a third electrode. The first electrode may be disposed in a first plane and the second electrode and the third electrode may be disposed in a second plane, the first and second planes associated with a first direction parallel to the first surface. The first and second electrodes may be at least partially offset in the first direction. The first and third electrodes may be at least partially offset in the first direction. The sensor system may be configured to generate an output signal in response to a shear stress within the sensing material.

28 Claims, 6 Drawing Sheets

(56) References Cited

U.S. PATENT DOCUMENTS

| | | |
|---|---|---|
| 8,250,926 B2 | 8/2012 | Yang et al. |
| 8,421,311 B2 | 4/2013 | Chuang |
| 8,943,897 B2 * | 2/2015 | Beauvais ............. A61B 5/1038 73/777 |
| 9,136,459 B2 * | 9/2015 | Fujii ....................... H01L 41/04 |
| 9,222,846 B2 | 12/2015 | Lim et al. |
| 9,229,592 B2 | 1/2016 | Bulea et al. |
| 9,347,838 B2 * | 5/2016 | Chen ....................... G01L 1/142 |
| 2003/0164048 A1 | 9/2003 | Shkel |
| 2017/0016785 A1 | 1/2017 | Hall et al. |
| 2017/0160147 A1 * | 6/2017 | Genmei ................... G01B 7/16 |

* cited by examiner

SOLID-STATE SHEAR STRESS SENSORS WITH HIGH SELECTIVITY

PRIORITY DATA

This application claims benefit of priority to U.S. Provisional Application Ser. No. 62/193,209, titled "Solid-State Shear Sensors", filed Jul. 16, 2015, by Neal A. Hall, Donghwan Kim, Randall P. Williams, David P. Gawalt, Bradley D. Avenson, Caesar T. Garcia, and Kristofer L. Gleason, which is hereby incorporated by reference in its entirety as though fully and completely set forth herein.

FIELD OF THE INVENTION

This disclosure relates generally to sensors, and more particularly to solid-state shear-stress sensors for use in, for example, experimental diagnostic tools.

DESCRIPTION OF THE RELATED ART

Pressure (or more generally, stress) sensors, which may be used in a variety of applications (e.g., military and/or commercial aircraft (including subsonic and hypersonic vehicles), military and/or commercial boating, research and development, commercial products, biomechanics, etc.), generally include a means of measuring a pressure or stress acting on a surface. Such sensors may measure normal stress (acting orthogonal to the surface) and/or shear stress (acting parallel to the surface). Such stresses may result from flow applications (that is, applications involving the flow of a fluid across the surface) and/or from touch applications (that is, applications involving a solid object in direct contact with the surface).

Some applications (e.g., applications involving the complex flows encountered in ground and flight tests related to hypersonic vehicles) require reliable experimental diagnostic tools, including stress sensors. Such applications may involve flows that include any combination of flows that are three dimensional, unsteady, or transitional and may further involve flows over rough surfaces, combustion (e.g., chemical reactions that may release energy in the form of heat and/or light) or shock waves. Historically, only indirect methods (such as heat flux measurements) have been used to measure shear stress in applications with high-speed or complex flows.

What is needed is a stress sensor that is ready and easy to use, reliable, temporally and spatially resolved as required by the user, and/or capable of withstanding high temperatures (e.g., up to 1200K).

Further applications similarly require improvements in existing stress-sensor technology. For example, stress sensors may be used in touch sensing applications, including for a "smart skin" that may envelop a robotic or prosthetic hand or for development of an algorithm for controlling grip. Such applications may require a variety of stress sensing technologies, including a sensor or a sensor package that can detect both normal and shear stress.

Further improvements in the field are desired.

SUMMARY OF THE INVENTION

Various embodiments of solid-state stress sensors are presented herein. In some embodiments, a sensor system may include a substrate, a first layer of sensing material disposed on a first layer of the substrate, and at least three electrodes forming a first and second electrode pair. The at least three electrodes may include a first electrode, a second electrode, and a third electrode. The first electrode may be disposed in a first plane and the second electrode and the third electrode may be disposed in a second plane. The first and second planes may be associated with a first direction that is substantially parallel to the first surface of the substrate, e.g., the first and second planes may be substantially parallel to one another and the first surface of the substrate. The first and second electrodes may be at least partially offset in the first direction. The first and third electrodes may be at least partially offset in the first direction. For example, the first direction may be defined as a horizontal direction and the first and second planes may be offset in a vertical direction whereas the first and second electrodes may be at least partially offset in a horizontal direction and, similarly, the first and third electrodes may be at least partially offset in the horizontal direction. In addition, the sensor system may be configured to generate an output signal in response to a shear stress within the sensing material.

In some embodiments, a sensor system may include a substrate, a first layer of sensing material disposed on the substrate, and at least two electrodes forming an electrode pair. The at least two electrodes may include a first electrode and a second electrode. The first and second electrodes may be disposed in a first plane associated with a first direction. The first layer of sensing material may have a polarization that is approximately orthogonal to the first plane within the sensing material.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF THE INVENTION

Terms

Approximately/Substantially—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application. Furthermore, the term approximately may be used interchangeable with the term substantially. In other words, the terms approximately and substantially are used synonymously to refer to a value, or shape, that is almost correct or exact.

Couple—refers to the combining of two or more elements or parts. The term "couple" is intended to denote the linking of part A to part B, however, the term "couple" does not exclude the use of intervening parts between part A and part B to achieve the coupling of part A to part B. For example, the phrase "part A may be coupled to part B" means that part A and part B may be linked indirectly, e.g., via part C. Thus part A may be connected to part C and part C may be connected to part B to achieve the coupling of part A to part B.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Processing Element (or Functional Unit)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Piezoelectric Structure—refers to at least one layer of piezoelectric material with at least one electrode disposed on the at least one layer of piezoelectric material.

Trans-impedance amplifier—refers to a current to voltage converter, most often implemented using an operational amplifier.

Piezoelectric sensor—refers to a sensor that relies on the piezoelectric effect, i.e., the electromechanical interaction between the mechanical and the electrical state in a certain class of materials.

Open-circuit voltage—refers to the difference of electrical potential between two terminals of a device when disconnected from any circuit.

Short-circuit charge—refers to charge moved between electrodes of a sensor when the voltage across the sensor is zero.

Short-circuit current—refers to the current moved between electrodes of a sensor when the voltage across the sensor is zero.

Wave number—refers to the spatial frequency of a wave, either in cycles per unit distance or radians per unit distance.

Sensing surface—refers to the surface of a sensor upon which an external force acts.

Sensing cell (or sensing unit)—refers to the portion of a sensor that includes the sufficient components to act as a standalone sensor. For example, a sensor that is a single electrode pair sensor may include a single pair of electrodes (such as a top electrode and a bottom electrode). Alternatively, a sensor that is a differential sensor may include three electrodes (such as a top electrode and two bottom electrodes). A sensing cell is a component that may serve as a standalone sensor or alternatively may be electrically connected in parallel to other sensing cells to form a larger sensor element.

Figure 1A:
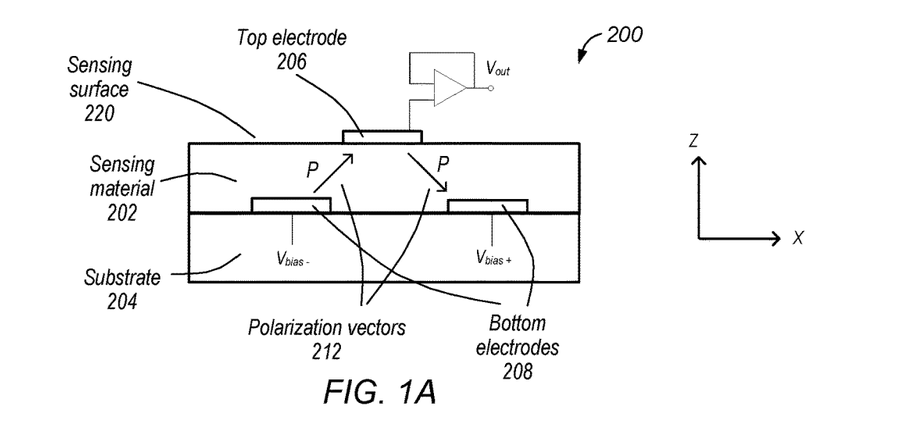
FIGS. 1A-1E illustrate examples of a differential (or dual) sensing cell according to some embodiments.
Figure 1B:
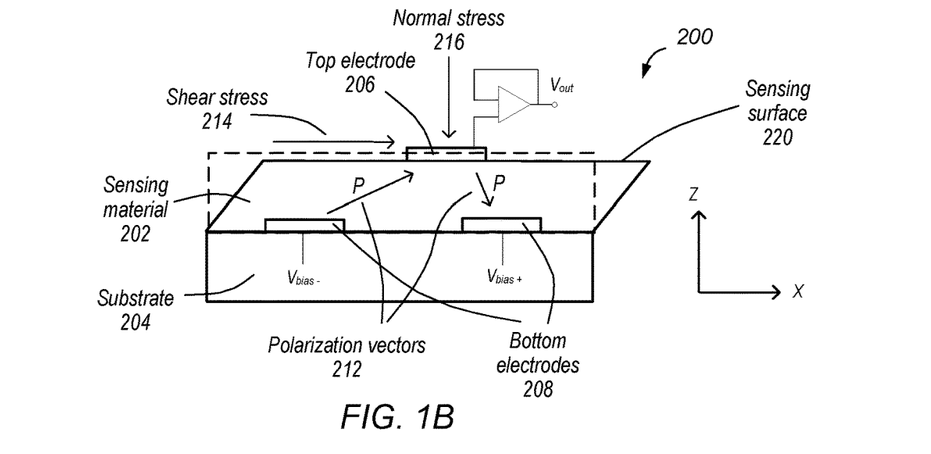
Figure 1C:
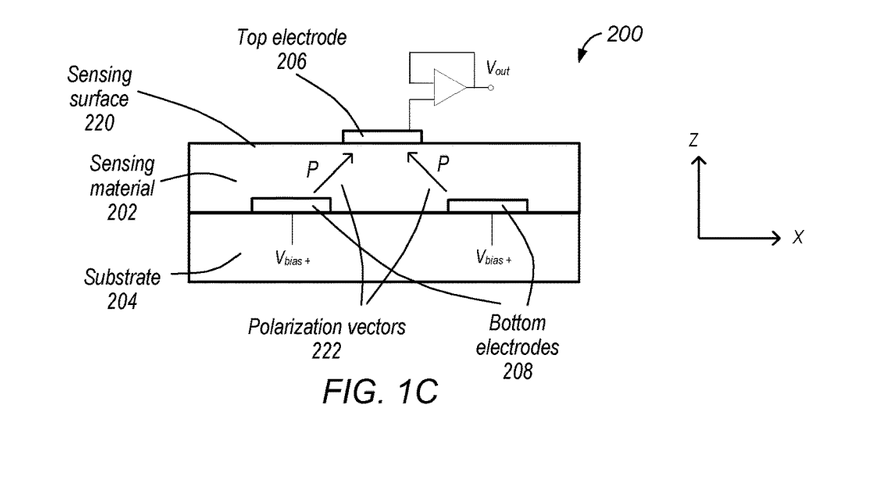
Figure 1D:
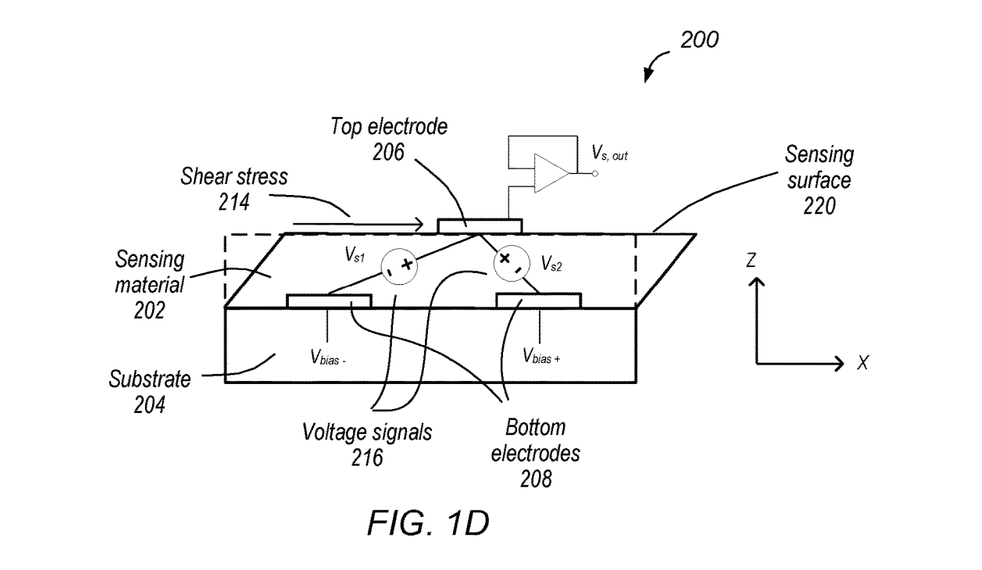
Figure 1E:
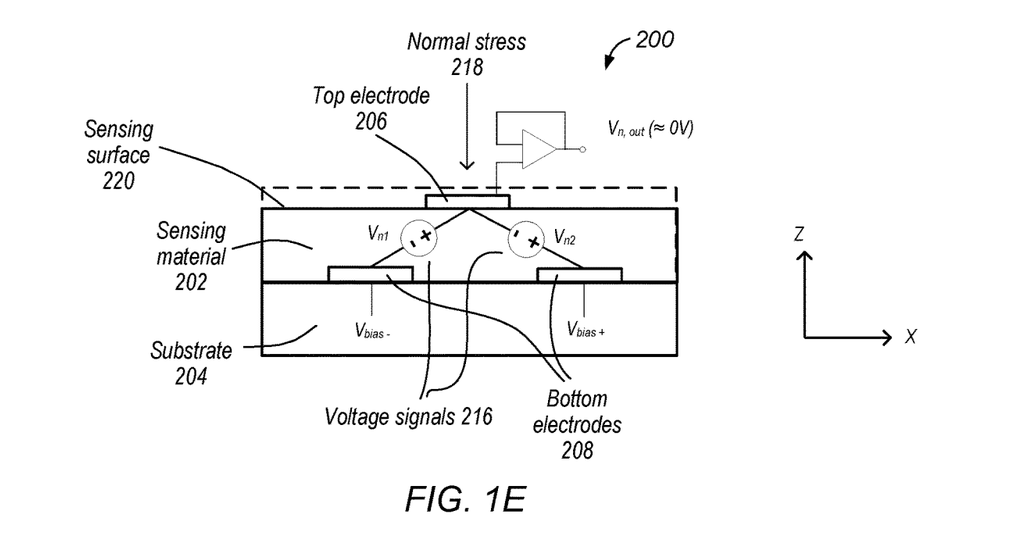
Figure 2A:
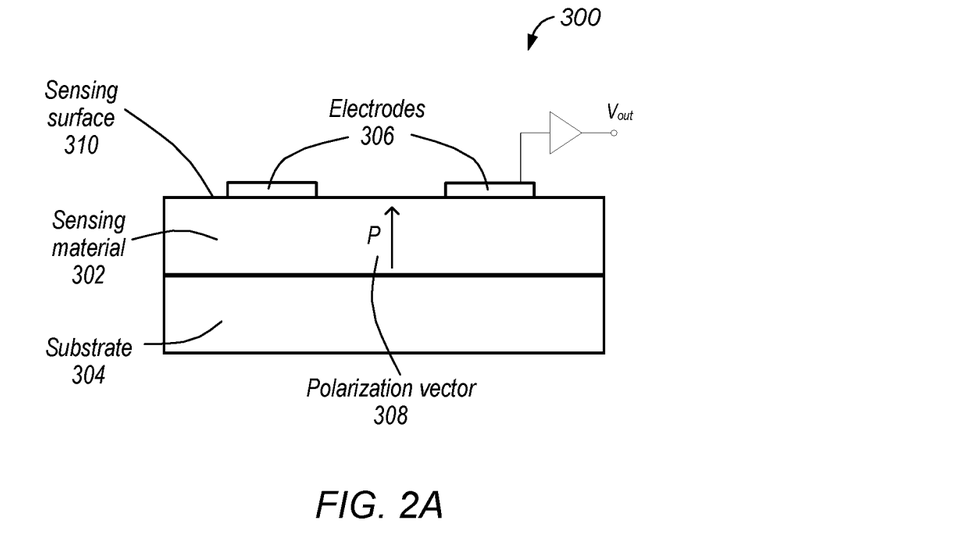
FIGS. 2A-2B illustrate a 1-5 mode sensing cell according to some embodiments.
Figure 2B:
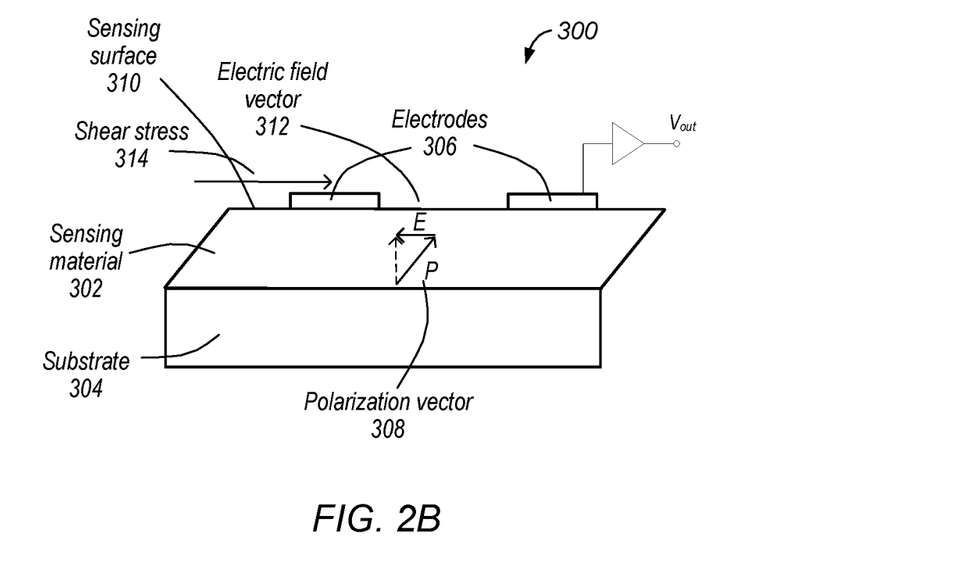
Figure 3A:
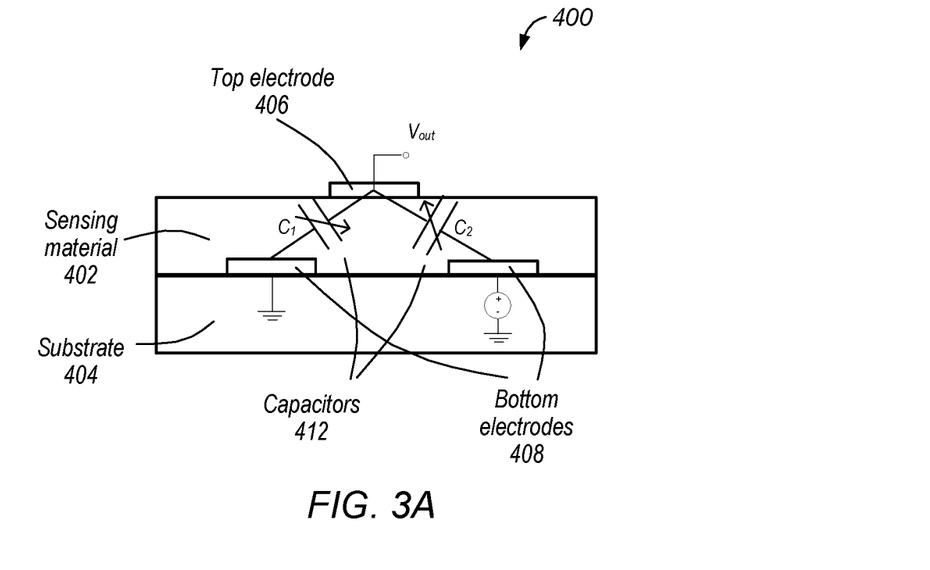
FIGS. 3A-3B illustrate a DC sensing cell according to some embodiments.
Figure 3B:
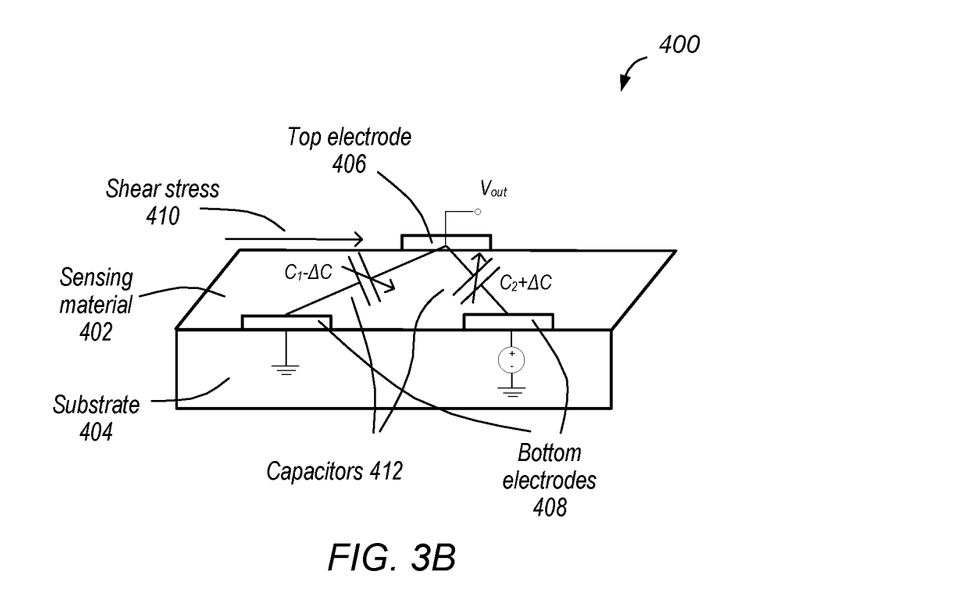
Figure 3C:
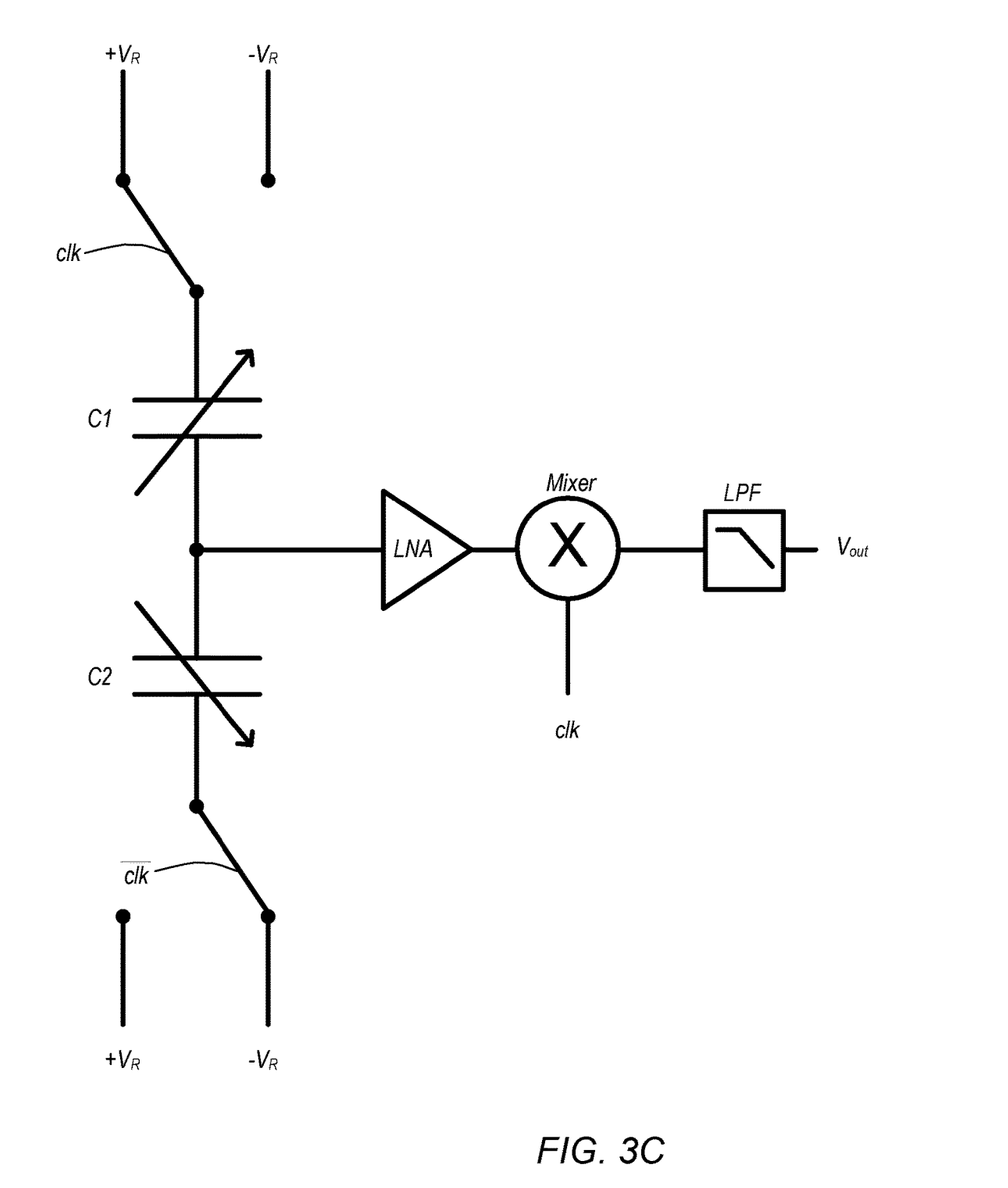
FIG. 3C illustrates a circuit schematic for sensing a signal of a DC sensing cell according to some embodiments.

FIGS. 1-3: Embodiments of a Solid State Shear Sensor

Turning now to FIGS. 1A-1E, a solid state sensor 200 is depicted according to some embodiments. Solid state sensor 200 may be a differential (or dual) sensing cell (e.g., a sensor that selectively responds to shear stress but not normal stress). Sensor 200 may be used if a measurement of shear stress, but not normal stress as desired. Sensor 200 may include at least three electrodes: a first electrode in a first plane (e.g., top electrode 206) and two electrodes associated with a second plane substantially parallel to and offset from the first plane (e.g., bottom electrodes 208). In some embodiments, the first and second planes may be parallel to a first surface of substrate 204. The at least three electrodes may be offset by a determined distance, as illustrated in FIGS. 1A and 1C. An electrical polarization may be induced in sensing material 202 by imposing one or more external biases. For example, the sensing material may be polarized by a positive bias and/or by a negative bias, each of which may induce a respective polarization vector. The polarization may be permanent (as in the case of a piezoelectric material), semi-permanent (as in the case of a poled ferroelectric material), or held in place with a positive and negative bias during operation (e.g., as depicted by polarization vectors 212 in FIG. 1A). In some embodiments, the polarization may be held in place with positive bias during operation (e.g., as depicted by polarization vectors 222 in FIG. 1C). The positive and/or negative biases may be required in the case of an electrostrictive sensing material.

Sensing material 202 may include a material that is electrostrictive (e.g., a material that changes shape in response to the application of an electric field), ferroelectric (e.g., a material that has the ability to store a permanent electrical polarization), and/or piezoelectric (e.g., a material that generates an electrical charge in response to the application of mechanical stimuli), or any material that can produce an electric potential (e.g., a voltage) when strained. Note that at least some of the above characteristics of the sensing material are not mutually exclusive. For example, all ferroelectric materials can exhibit piezoelectricity, while not all piezoelectric materials are ferroelectric. Substrate 204 may be made (or manufactured) from an appropriate material, including, for example, silicon, quartz, sapphire, or any other substrate known to those skilled in the art of semiconductor manufacture.

In some applications, an electrical polarization may be induced in sensing material 202, for example by imposing an external bias (e.g., a 5V direct current (DC) bias). The induced electrical polarization may be represented by a polarization vector, such as polarization vectors 212 as depicted in FIG. 1A or polarization vectors 222 as depicted in FIG. 1C. Polarization vectors 212/222 may be respectively oriented between top electrode 206 and bottom electrodes 208 and may be at an angle relative to a sensing surface of sensor 200 (e.g., polarization vectors 212/222 may be orientated at 15, 30, 45, or 60 degrees relative to sensing surface 220, among other orientations). Note that some materials, such as ferroelectric materials, may maintain the electrical polarization even after removal of the bias if the material undergoes a poling procedure at certain temperatures (e.g., a temperature elevated at or above room temperature). In other words, for these materials, the presence of a bias during operation may be optional. With other materials, such as electrostrictive materials, a non-zero bias may be required during operation.

In some embodiments, the offset electrodes may create two distinct regions in the differential sensing cell. A first region may include the bottom left electrode and the top electrode. The first region may be electrically polarized such that a resulting polarization vector may point "upward" (i.e., from the bottom left electrode toward the top electrode). A second region may include the bottom right electrode and the top electrode. The second region may be electrically polarized such that a resulting polarization vector may point "downward" (e.g., from the top electrode toward the bottom right electrode as depicted in FIG. 1A). Note that in some embodiments, the second region may be electrically polarized such that a resulting vector may point "upward" (e.g., from the bottom right electrode toward the top electrode as depicted in FIG. 1C).

Note that the respective external biases do not need to be equal in magnitude. Further, in an embodiment including a poled sensing material, the poling voltages used for each electrode may be substantially different in magnitude or may be substantially (or approximately) similar in magnitude. In other words, the strength of the polarization in each respective region of the sensing cell (e.g., in the first region as compared to the second region) may be independently tailored.

As shown in FIG. 1B, sensor 200 may be exposed to a normal stress and/or a shear stress applied at sensing surface 220, in response to which sensing material 202 may deform in the direction of the applied force. In response to the deformation of sensing material 202, the polarization vectors 212 may elongate and/or contract, creating an electrical potential that may be measured as described above. For example, as shown in FIG. 1C, in response to shear stress 214, sensing material 202 may deform in an x direction and may cause the first region (e.g., the region defined by the bottom left electrode and the top electrode) to elongate in an x direction and the second region (e.g., the region defined by the top electrode and the bottom right electrode) to contract in the x direction. The respective elongation of the first region and the contraction of the second region may produce electrical signals (e.g., voltage signals 216 as depicted in FIG. 1D) of the same polarity (e.g., due to the orientation of polarization vectors 212 as depicted in FIG. 1A). Note that in other embodiments, the elongation of the first region and the contraction of the second region may produce electrical signals of opposite polarity (e.g., due the orientation of polarization vectors 222 as depicted in FIG. 1C). In other words, sensor 200 may produce a measureable electrical signal (e.g., an output signal) in response to shear stress 214.

Turning now to FIG. 1E, sensing material 202 may deform in a z direction in response to normal stress 218, which may cause the first region and the second region to contract in the z direction. In response to the deformation of sensing material 202, polarization vectors 212/222 may contract in the same direction (e.g., the z direction) by an equivalent (or approximately equivalent) magnitude, which may cause, in the first region and in the second region, the production of respective electrical signals (e.g., voltage signals 216) of substantially (or approximately) similar magnitude. Note that in embodiments as exemplified by FIG. 1A, the respective electrical signals may have opposite polarity whereas in embodiments as exemplified by FIG. 1C, the respective signals may have identical (or the same) polarity. Thus, the contraction of sensing material 202 in response to normal stress 218 may produce a zero (or approximately zero) net signal (e.g., via a summation of the respective electrical signals in embodiments as exemplified by FIG. 1A or via a differencing of the respective electrical signals in embodiments as exemplified by FIG. 1C). Note that sensor 200 may thus entail an extremely high selectivity to shear stress while remaining relatively unresponsive to normal stress.

Note that sensor 200 may be configured for sensitivity to normal stress. In some embodiments, such sensitivity may be accomplished by differencing the respective electrical signals in embodiments as exemplified by FIG. 1A or via summing the respective electrical signals in embodiments as exemplified by FIG. 1C.

Turning now to FIG. 2A-2B, a solid state sensor 300 is depicted according to some embodiments. Sensor 300 may be a 1-5 mode cell. Those skilled in the art of piezoelectric transducers will recognize that a 1-5 mode sensor refers to a shear sensing modality in which an electric field results from shear strain. The numbering convention is common in the art and implies that the strain is a rotation about a so-called "5" axis and that the effective electrodes reside substantially perpendicular (or substantially orthogonal) to a so-called "1" axis. Sensor 300 may comprise sensing material 302 and substrate 304. Sensing material 302 may be formed from a piezoelectric material (e.g., a crystalline or polycrystalline piezoelectric crystal such as AlN) or from a poled ferroelectric material. Sensing material 302 may be electrically polarized according to the systems described above such that polarization vector 308 has a direction that is substantially vertical (that is, substantially normal to the sensing surface). Notably, sensor 300, which may be a 1-5 mode sensing cell, may function under some extreme conditions (e.g., under extreme temperatures).

Sensor 300 may include electrodes 306, including a first electrode and a second electrode. Electrodes 306 may reside (or be disposed) on sensing surface 310 of sensing material 302 (as illustrated in FIG. 2A), on a bottom surface of sensing material 302 (e.g., on the surface that interfaces with substrate 304), within sensing material 302, or in some combination of the above. In other words, electrodes 306 need not reside (or be disposed) on the same surface as each other (i.e., they need not reside on (or in) the same plane as each other).

As shown in FIG. 2B, sensor 300 may be exposed to a shear force that may cause sensing material 302 to deform in a direction of the applied force (e.g., FIG. 2B illustrates deformation in response to shear stress 314). In response to the deformation in sensing material 302, polarization vector 308 may respond in the direction of the deformation (e.g., in the direction of the force acting on the sensor). As illustrated in FIG. 2B, polarization vector 308 may transition from a substantially normal position (that is, substantially orthogonal to sensing surface 310) before exposure to shear stress 314 to a tilted position (e.g., a position that is relatively less orthogonal to sensing surface 310 as compared to the substantially normal position) after exposure to shear stress 314. Notably, the degree to which polarization vector 308 tilts (relative to a position orthogonal to sensing surface 310) may exist on a spectrum that ranges from more than zero degrees to less than 90 degrees. In response to the tilt of polarization vector 308, an electric field may result, wherein the electric field is oriented parallel (or approximately parallel) to sensing surface 310. Electric field E may produce an electrical potential (e.g., a voltage) that may be measured by electrodes 306.

Turning now to FIGS. 3A-3B, a solid state sensor 400 is depicted according to some embodiments. Sensor 400 may be a DC sensing cell. Sensor 400 may be used if the detection of DC (or slow varying) shear stress is desired (e.g., a shear stress with a low frequency response, including, for example, a frequency response of approximately 100 MHz, 10 MHz, 1 MHz, among other values, including shear stresses with a periodicity of days, months, or years). Sensor 400 may include sensing material 402 and substrate 404. Sensing material 402 may be formed from a piezoelectric material, ferroelectric material, an electrostrictive material, or any dielectric or semiconductor material, as described above.

Notably, sensor 400 may use a differential capacitance detection scheme. Sensing material 402 may include at least three electrodes, such as top electrode 406 and bottom electrodes 408. As illustrated, the offset electrodes may create two distinct regions in the differential sensing cell. A first region may include the bottom left electrode and the top electrode. Within the first region, the top electrode and the bottom left electrode may form a capacitor that may encompass the first region. A second region may include the bottom right electrode and the top electrode. Within the second region, the top electrode and the bottom right electrode may form a capacitor that may encompass the second region. Note that the ability of top electrode 406 and each respective bottom electrode 408 to form a capacitor is indicated schematically in FIG. 3A by variable capacitors 412.

As shown in FIG. 3B, sensor 400 may be exposed to shear stress 410 resulting from an applied force, and sensing material 402 may deform, in response to the applied force, in the direction of the applied force. In response to the deformation of sensing material 402, top electrode 406 may move closer to the bottom right electrode and further from the bottom left electrode. As a result, the capacitance (e.g., capacitors 412 as illustrated schematically in FIG. 3B) as defined by the top electrode and the bottom right electrode may increase (e.g., $C_2$ may increase by an amount $\Delta C$) and the capacitance as defined by the top electrode and the bottom left electrode may decrease (e.g., $C_1$ may decrease by an amount $\Delta C$).

Turning now to FIG. 3C, an example circuit schematic for sensing a signal of a direct current (DC) sensing cell according to some embodiments is illustrated. In some embodiments, a means for sensing a signal, e.g., a sensing circuit, of a DC sensing cell may include a voltage divider formed by two capacitors in series (e.g., $C_1$ and $C_2$ as illustrated in FIG. 3C). The sensing means may also include an alternating current (AC) source waveform, the amplitude of which may be detected (or measured) using demodulation techniques (e.g., via a low noise amplifier (LNA of FIG. 3C), a mixer with a clock source (Mixer and clk of FIG. 3C), and a low pass filter (LPF of FIG. 3C) known to those skilled in the art. In some embodiments, the amplitude of the AC source waveform as measured at the node between the two capacitors may be proportional to the DC shear applied to sensor 400. In other words, reading the voltage at top electrode 406 by means of, for example, a voltage divider formed by two series capacitors (as illustrated in FIG. 3C) may provide a signal indicating the magnitude of shear stress 410 applied to sensor 400.

Methods of Manufacture

As discussed above, a sensor may include a sensing material, a substrate, and a number of electrodes (e.g., sensor 200 may include at least three electrodes, such as top electrode 206 and bottom electrodes 208). According to some embodiments, a sensor may be manufactured (or created) using a number of manufacturing techniques, including, for example, a microfabrication procedure (e.g., a fabrication technique common in the field of microelectromechanical systems (MEMS)). As discussed above, a sensor may include a substrate (e.g., substrate 104 of sensor 100), wherein the substrate is made out of an appropriate material (e.g., silicon, sapphire, quartz, silicon-on-insulator wafers, or any other substrate common in the field of MEMS and/or semiconductor manufacture).

Any of the electrodes included in the sensor may be realized (or situated) by depositing and etching layers of material (e.g., metal layers such as aluminum, titanium, platinum, or any other suitable material) in a manner known to those skilled in the art. In some embodiments, the electrodes may include one or more layers of materials (e.g., an electrode may include titanium and platinum, wherein the titanium provides an adhesion layer for the platinum). Alternative to depositing and etching layers of material to realize the electrodes, the electrodes may be realized (or patterned) by means of a lift-off procedure in a manner known to those skilled in the art.

According to some embodiments, the sensing material of a sensor may be made (or manufactured) from any suitable material, including, for example, a ferroelectric material (e.g., lead zirconate titanate (PZT)), a piezoelectric material (e.g., a piezoelectric crystal such as, for example, aluminum nitride (AlN) or zinc oxide (ZnO)), an electrostrictive material, or any material that can produce an electric potential (e.g., a voltage) when strained. According to some embodiments, the sensing material may be deposited, situated, or grown using standard MEMS processing techniques known to those skilled in the art. For example, the sensing material may be PZT and the PZT may be spun onto a wafer using a sol-gel process known to those skilled in the art.

According to some embodiments, electrical access to an electrode (e.g., bottom electrodes 208 of sensor 200) may be obtained in an etching step (e.g., sensing material 202 may be selectively etched in a region away from top electrode 206 and from bottom electrodes 208). In other words, sensing material 202 may be etched away from the sensing surface of sensing material 202 (e.g., in a region of the sensing material not proximate to top electrode 206 or to bottom electrodes 208). Any of the discussed etching steps may be performed according to a number of wet and/or dry etching processes known to those skilled in the art.

Figure 4:
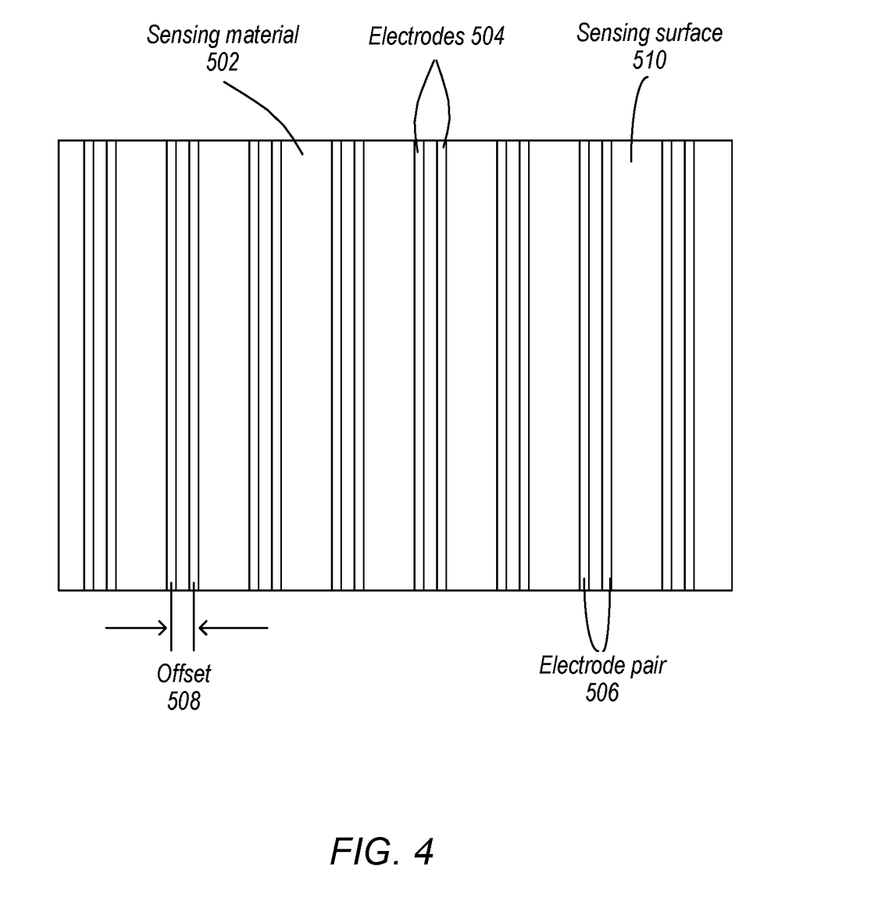
FIG. 4 illustrates an array of sensing cells according to some embodiments.

FIG. 4: Parallel Array of Sensing Cells

Turning now to FIG. 4, an array of sensing cells is illustrated, from a top view, according to some embodiments. The sensors as discussed above may include a single unit cell (e.g., as a sensing cell, which may serve as a standalone sensor) or may include an array of sensing cells (e.g., a number of sensing cells may be electrically connected in parallel) to form a larger sensor element. Note that a sensor that includes an array of sensing cells may have a higher sensitivity and a higher resolution as compared to a single sensing cell acting as a standalone sensor.

According to some embodiments, electrodes 504 may be disposed (or situated) adjacent to (or coupled to) sensing surface 510 of sensing material 502. Note that the embodiment illustrated in FIG. 4 includes an array of 1-5 mode sensing cells arranged in parallel as viewed from a top view. The illustration in FIG. 4 shows top electrodes 504. Note that other embodiments (e.g., a single electrode pair sensor, or a differential sensor, or a DC sensor) may include a single top electrode disposed (or situated) adjacent to (or coupled to) sensing surface 510 of sensing material 502. In the illustrated embodiment, a number of electrode pairs 506 may be offset 508 from each other by an appropriate distance (e.g., the electrodes comprising electrode pair 506 may be offset from each other by 0.2 μm, 2 μm, 20 μm, or any other appropriate distance). The region of sensing surface 510 between electrode pair 506 may include an active sensing region of the sensing cell. An electrode pair 506 combined with the active sensing material 502 residing in between the two electrodes forming an electrode pair 506 shall be known as a sensing cell. In an embodiment including an array of sensing sells, each electrode pair 506 may be separated from an adjacent electrode pair 506 by an appropriate distance (e.g., electrode pair 506 may be separated from adjacent electrode pair 506 by 1 μm, 10 μm, 100 μm, or any other appropriate distance). Note also that regions of the sensing material 502 residing outside of sensing cells may be selectively etched away to enhance the electrical and/or mechanical isolation between sensing cells.

Note that a number of sensors and/or sensing cells according to one or various embodiments discussed above may be fabricated (or manufactured) in parallel. Sensing cells sensitive to shear stress and sensing cell sensitive to normal stress may be fabricated in parallel and may reside (or be disposed) on the same die together (e.g., in close proximity).

According to some embodiments, any number of sensors (e.g., a single sensor or more than one sensor) may be fabricated on a single die. The die may be mounted (or reside) on the head of a shaft. The shaft may be mounted on a panel or in a wall such that the sensor or sensors on the die are approximately (or substantially) flush with the panel or the wall. According to some embodiments, the shaft and the panel or the wall may be threaded, such that the shaft may be advanced into the panel or the wall. The signal or signals from the sensor or sensors mounted on the shaft may be determined (or measured) using readout electronics. The readout electronics may be positioned away from the sensing surface (e.g., away from the sensing cells). The signal or signals from the sensor or sensors may be connected to the readout electronics using a cable (e.g., a flexible cable) or by any other appropriate means.

Measuring the Output of a Sensing Cell

According to some embodiments (e.g., the single electrode pair sensing cell, the differential sensing cell, or the 1-5 mode sensing cell), the signal (or the output) of a sensing cell may be input into an amplifier. For example, the amplifier may be a high input impedance configuration, in which case the voltage of the signal is the measurand, or the amplifier may be a low input impedance amplifier (e.g., the low input impedance amplifier may be a charge amplifier or a transimpedance amplifier), in which case the charge (or the current) is the measurand. For the differential (or dual) sensing cell configuration, a voltage measurement (e.g., as measured using a high input impedance configuration of the amplifier) may be advantageous in preserving the selectivity to shear stress as compared to normal stress. In other words, a voltage readout may mitigate a manufacturing (or fabrication) misalignment as between the spacing of the at least three electrodes of the sensing cell. Note that the signal generated by a sensing cell may be routed through the substrate (e.g., through silicon or any other appropriate material as discussed above) using through-wafer vias.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer program, if executed by a computer system, may cause the computer system to perform a method, e.g., any of a method embodiments described herein, or, any combination of the method embodiments described herein, or, any subset of any of the method embodiments described herein, or, any combination of such subsets.

In some embodiments, a device may be configured to include a processor (or a set of processors) and a memory medium, where the memory medium stores program instructions or a computer program, where the processor is configured to read and execute the program instructions or computer program from the memory medium, where the program instructions are, or computer program is, executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A sensor system, comprising:
   a substrate;
   a first layer of sensing material disposed on a first surface of the substrate; and
   at least three electrodes forming a first and a second electrode pair, wherein the at least three electrodes comprise a first electrode, a second electrode, and a third electrode, wherein the first electrode is disposed in a first plane, wherein the second electrode and the third electrode are disposed in a second plane, wherein the first and second planes are associated with a first direction that is substantially parallel to the first surface, wherein the first and second electrodes are at least partially offset in the first direction, and wherein the first and third electrodes are at least partially offset in the first direction;
   wherein a first polarization is induced between or across the first and second electrodes, wherein the first polarization induces a first polarization vector, wherein the first polarization vector has a direction substantially parallel to a third plane defined by the first and second electrodes; and
   wherein the sensor system is configured to generate an output signal in response to a shear stress within the sensing material.

2. The sensor system of claim 1,
   wherein the first electrode is disposed on a surface of the sensing material, and wherein the second and third electrodes are disposed on the first surface of the substrate.

3. The sensor system of claim 1,
   wherein a second polarization is induced between or across the first and third electrodes, wherein the second polarization induces a second polarization vector, wherein the second polarization vector has a direction substantially parallel to a fourth plane defined by the first and third electrodes.

4. The sensor system of claim 3,
   wherein the second polarization vector has a vertical component with polarity that opposes a polarity of a vertical component of the first polarization vector.

5. The sensory system of claim 3,
   wherein the second polarization vector has a vertical component with polarity that aligns with a polarity of a vertical component of the first polarization vector.

6. The sensor system of claim 1,
   wherein the output signal is useable to sense force and/or stress responsive to a force applied to the sensor system.

7. The sensor system of claim 1,
   wherein the output signal is useable to sense a shear force and/or a shear stress responsive to a force applied to the sensor system.

8. The sensor system of claim 7,
   wherein the force applied to the sensor system comprises at least one of:
   a force from a fluid in contact with the sensor system; or
   a force from a solid in contact with the sensor system.

9. The sensor system of claim 1,
   wherein the shear stress is responsive to a force applied to the sensor system, wherein the force applied comprises a force vector comprising a first force component orthogonal to the sensor system and a second force component parallel to the sensor system.

10. The sensor system of claim 9, wherein the shear stress is responsive to the second force component.

11. The sensor system of claim 1, wherein a direct current (DC) bias voltage is applied between or across the first electrode pair and the second electrode pair during operation.

12. The sensor system of claim 1, wherein the first layer of sensing material is one of a ferroelectric material or a piezoelectric material.

13. The sensor system of claim 1, wherein at least one of the at least three electrodes is disposed within the first layer of sensing material.

14. The sensor system of claim 1, wherein the substrate is one of silicon or sapphire.

15. The sensor system of claim 1, wherein the at least three electrodes form a network of capacitances, wherein a relative value of the capacitances is altered by a deformation of the sensing material in response to an applied stress or force.

16. The sensor system of claim 15, wherein the at least three electrodes are configured in series, and a middle electrode potential is measured to obtain information associated with a shear force applied to the sensing material.

17. A sensor system, comprising:
a substrate;
a first layer of sensing material disposed on a first surface of the substrate; and
at least three electrodes forming a first electrode pair and a second electrode pair, wherein the at least three electrodes comprise a first electrode, a second electrode, and a third electrode, wherein the first electrode is disposed in a first plane on a first surface of the sensing material, wherein the second electrode and the third electrode are disposed in a second plane on the first surface of the substrate, wherein the first and second planes are associated with a first direction that is substantially parallel to the first surface of the substrate, wherein the first and second electrodes are at least partially offset in the first direction, and wherein the first and third electrodes are at least partially offset in the first direction;
wherein a first polarization is induced between or across the first and second electrodes, wherein the first polarization induces a first polarization vector, wherein the first polarization vector has a direction substantially parallel to a third plane defined by the first and second electrodes; and
wherein the sensor system is configured to generate an output signal in response to a shear stress within the sensing material.

18. The sensor system of claim 17, wherein a second polarization is induced between or across the first and third electrodes, wherein the second polarization induces a second polarization vector, wherein the second polarization vector has a direction substantially parallel to a fourth plane defined by the first and third electrodes.

19. The sensor system of claim 18, wherein the second polarization vector has a vertical component with polarity that opposes a polarity of a vertical component of the first polarization vector.

20. The sensory system of claim 18, wherein the second polarization vector has a vertical component with polarity that aligns with a polarity of a vertical component of the first polarization vector.

21. The sensor system of claim 17, wherein the output signal is useable to sense a shear force and/or a shear stress responsive to a force applied to the sensor system, wherein the force applied to the sensor system comprises at least one of:
a force from a fluid in contact with the sensor system; or
a force from a solid in contact with the sensor system.

22. The sensor system of claim 17, wherein a direct current (DC) bias voltage is applied between or across the first electrode pair and the second electrode pair during operation.

23. The sensor system of claim 17, wherein the at least three electrodes form a network of capacitances, wherein a relative value of the capacitances is altered by a deformation of the sensing material in response to an applied stress or force, and wherein the at least three electrodes are configured in series, and a middle electrode potential is measured to obtain information associated with a shear force applied to the sensing material.

24. A sensor system, comprising:
a substrate;
a first layer of sensing material disposed on a first surface of the substrate; and
at least three electrodes forming a first electrode pair and a second electrode pair, wherein the at least three electrodes comprise a first electrode, a second electrode, and a third electrode, wherein the first electrode is disposed in a first plane, wherein the second electrode and the third electrode are disposed in a second plane, wherein the first and second planes are associated with a first direction that is substantially parallel to a first surface of the substrate, wherein the first and second electrodes are at least partially offset in the first direction, and wherein the first and third electrodes are at least partially offset in the first direction; and
wherein a first polarization is induced between or across the first and second electrodes, wherein the first polarization induces a first polarization vector, wherein the first polarization vector has a direction substantially parallel to a third plane defined by the first and second electrodes.

25. The sensor system of claim 24, wherein the sensor system is configured to generate an output signal in response to a shear stress within the sensing material, wherein the output signal is useable to sense a shear force and/or a shear stress responsive to a force applied to the sensor system, wherein the force applied to the sensor system comprises at least one of:
a force from a fluid in contact with the sensor system; or
a force from a solid in contact with the sensor system.

26. The sensor system of claim 24, wherein a second polarization is induced between or across the first and third electrodes, wherein the second polarization induces a second polarization vector, wherein the second polarization vector has a direction substantially parallel to a fourth plane defined by the first and third electrodes.

27. The sensor system of claim 24, wherein a direct current (DC) bias voltage is applied between or across the first electrode pair and the second electrode pair during operation.

28. The sensor system of claim 24, wherein the at least three electrodes form a network of capacitances, wherein a relative value of the capacitances is altered by a deformation of the sensing material in response to an applied stress or force, and wherein the at least three electrodes are configured in series, and a middle electrode potential is measured to obtain information associated with a shear force applied to the sensing material.

* * * * *